(12) United States Patent
Suzuki (10) Patent No.: US 7,717,631 B2
(45) Date of Patent: May 18, 2010

(54) COIL BOBBIN, ACTUATOR, AND BLADE DRIVE DEVICE FOR CAMERA

(75) Inventor: Mitsuru Suzuki, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 12/470,891

(22) Filed: May 22, 2009

(65) Prior Publication Data

US 2009/0232490 A1 Sep. 17, 2009

Related U.S. Application Data

(63) Continuation of application No. PCT/JP2007/074323, filed on Dec. 18, 2007.

(30) Foreign Application Priority Data

Dec. 27, 2006 (JP) ............................. 2006-351574

(51) Int. Cl.
G03B 9/08 (2006.01)
H01F 27/30 (2006.01)
(52) U.S. Cl. ...................... 396/468; 336/208
(58) Field of Classification Search ................. 396/452, 396/468; 310/12.21, 14; 336/208
See application file for complete search history.

(56) References Cited

U.S. PATENT DOCUMENTS 5,420,559 A * 5/1995 Ohshiba et al. ............. 336/208

2005/0286889 A1 12/2005 Kihara
2006/0012457 A1 * 1/2006 Reppe et al. ................ 336/212

FOREIGN PATENT DOCUMENTS

| JP | 6-17206 | 3/1994 |
| JP | 6-96963 | 4/1994 |
| JP | 2006-11293 A1 | 1/2006 |

OTHER PUBLICATIONS

International Search Report for International Application No. PCT/JP2007/074323 dated Jan. 28, 2008.

* cited by examiner

*Primary Examiner*—Rodney E Fuller
(74) *Attorney, Agent, or Firm*—Kratz, Quintos & Hanson, LLP (57) ABSTRACT

A coil bobbin includes: a body portion around which a coil is wound and having a cylindrical shape; a pair of flange portions formed at both ends of the body portion respectively; and terminal portions which are formed in the pair of flange portions, respectively, the terminal portions being around which respective ends of the coil are wound. The pair of flange portions have thicker portions and thinner portions, respectively, different from each other in thickness. The pair of flange portions is formed to gradually reduce a thickness from the thicker portions toward the thinner portions, respectively. The terminal portions are formed in the thicker portions, respectively.

20 Claims, 6 Drawing Sheets

COIL BOBBIN, ACTUATOR, AND BLADE DRIVE DEVICE FOR CAMERA

CROSS-REFERENCE TO RELATED APPLICATION

This application is a continuation of and claims priority to International Patent Application No. PCT/JP2007/074323 filed on Dec. 18, 2007, which claims priority to Japanese Patent Application No. 2006-351574 filed on Dec. 27, 2006, subject matter of these patent documents is incorporated by reference herein in its entirety.

BACKGROUND OF THE INVENTION

1. Field of the Invention

The present invention relates to a coil bobbin, an actuator, and a blade drive device for a camera.

2. Description of the Related Art

A conventional coil bobbin includes: a body portion around which a coil is winded and which has a cylindrical shape; a pair of flange portions formed at both ends of the body portion respectively; and terminal portions around which ends of the coil is winded and formed in the pair of flange portions. Such a coil bobbin is employed in an actuator for driving a blade, as an example of a blade drive device for a camera disclosed in Japanese Unexamined Patent Application Publication No. 2006-11293.

Meanwhile, further downsizing has been still demanded for such a blade drive device for a camera as well as for the coil bobbin employed in the actuator. Downsizing of the coil bobbin is attained by forming the flange portion of the coil bobbin to be thin. However, if the flange portion is thinner, the flange portion may be deformed to be warped outwardly by the coil winded around the body portion. Additionally, since the terminal portion is formed in the flange portion, the deformation of the flange portion causes the terminal portion to be misaligned with its original position. On the other hand, when the flange portion is thicker, the deformation is hardly caused, but it is difficult to downsize the coil bobbin.

SUMMARY OF THE INVENTION

It is therefore an object of the present invention to provide a coil bobbin, an actuator, and a blade drive device for a camera, thereby maintaining the smaller sizes thereof and improving the endurances thereof.

According to a first aspect of the present invention, there is provided a coil bobbin including: a body portion around which a coil is wound and having a cylindrical shape; a pair of flange portions formed at both ends of the body portion respectively; and terminal portions formed in the pair of flange portions, respectively, the terminal portions being around which respective ends of the coil are wound, wherein at least one of the pair of flange portions has a thicker portion and a thinner portion different from each other in thickness, the at least one of the pair of flange portions is formed to gradually reduce a thickness from the thicker portion toward the thinner portion, and at least one of the terminal portions is formed in the thicker portion.

With such a configuration, since the at least one of the pair of flange portions has the thicker portion and the thinner portion different from each other in thickness, it is prevented that the flange portion is deformed to be warped outwardly by the coil wound around the body portion. This prevents a deformation of the flange portion and improves endurance thereof. Further, since the thickness of the flange portion is gradually changed, it is possible to prevent the lowering of the intensity according to drastic change in its thickness. Additionally, the gradual change in its thickness facilitates forming. In addition, since the terminal portion is formed in the thicker portion, a deformation of the terminal portion is prevented in accordance with the deformation of the flange portion. Additionally, the thinner portion contributes to the downsizing of the coil bobbin.

Additionally, according to a second aspect of the present invention, there is provided an actuator including: a coil bobbin around which a coil for excitation is wound; a rotor magnetized with differential magnetic poles in a circumferential direction and rotatably supported; and a stator inserted into the coil bobbin and effecting driving force by magnetic force on the rotor by energization of the coil. The coil bobbin includes: a body portion around which a coil is wound and having a cylindrical shape; a pair of flange portions formed at both ends of the body portion respectively; and terminal portions formed in the pair of flange portions, respectively, the terminal portions being around which respective ends of the coil are wound. At least one of the pair of flange portions has a thicker portion and a thinner portion different from each other in thickness, the at least one of the pair of flange portions is formed to gradually reduce a thickness from the thicker portion toward the thinner portion, and at least one of the terminal portions is formed in the thicker portion.

With such a configuration, since the at least one of the pair of flange portions has the thicker portion and the thinner portion different from each other in thickness, it is prevented that the flange portion is deformed to be warped outwardly by the coil wound around the body portion. This prevents a deformation of the flange portion and improves endurance thereof. Further, since the thickness of the flange portion is gradually changed, it is possible to prevent the lowering of the intensity according to drastic change in its thickness. Additionally, the gradual change in its thickness facilitates forming. In addition, since the terminal portion is formed in the thicker portion, a deformation of the terminal portion is prevented in accordance with the deformation of the flange portion. Additionally, the thinner portion contributes to downsizing of the coil bobbin, thereby downsizing the actuator.

Further, according to a third aspect of the present invention, there is provided a blade drive device for a camera, the device including: a base plate having a shutter opening; a blade supported for opening and closing the shutter opening; and the actuator of any one of the above described actuators, the actuator serving as a driving source of the blade.

With such a configuration, it is possible to provide a blade drive device for a camera, the device maintaining the smaller size thereof and improving the endurance thereof.

BRIEF DESCRIPTION OF THE DRAWINGS

Preferred embodiments of the present invention will be described in detail with reference to the following drawings, wherein:

FIGS. 5A to 5D are explanatory views of the coil bobbin;

DESCRIPTION OF THE PREFERRED EMBODIMENTS

A description will now be given, with reference to the accompanying drawings, an embodiment of the present invention.

Figure 1:
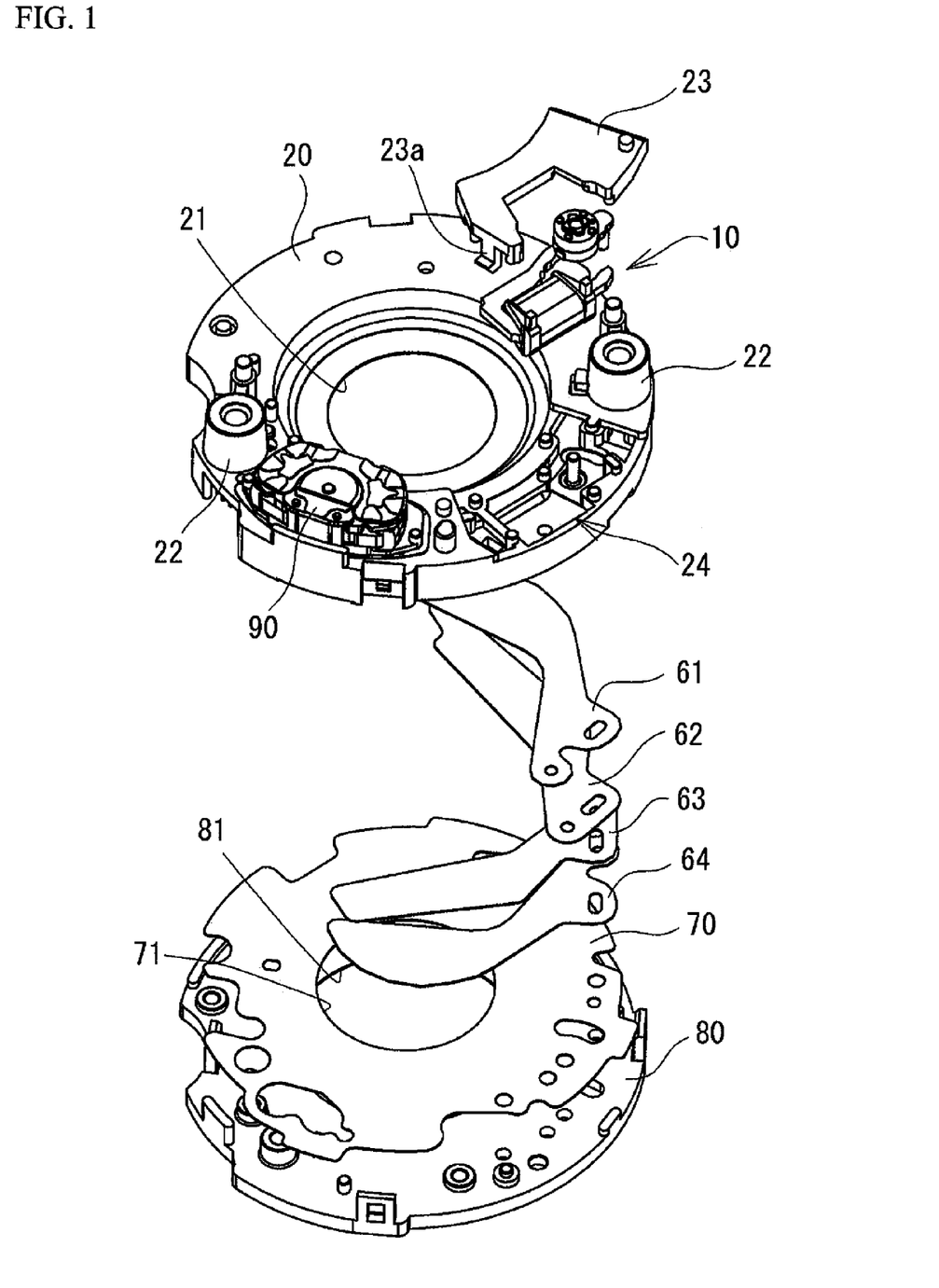
FIG. 1 is an exploded perspective view of a blade drive device for a camera according to the present embodiment.
Figure 2:
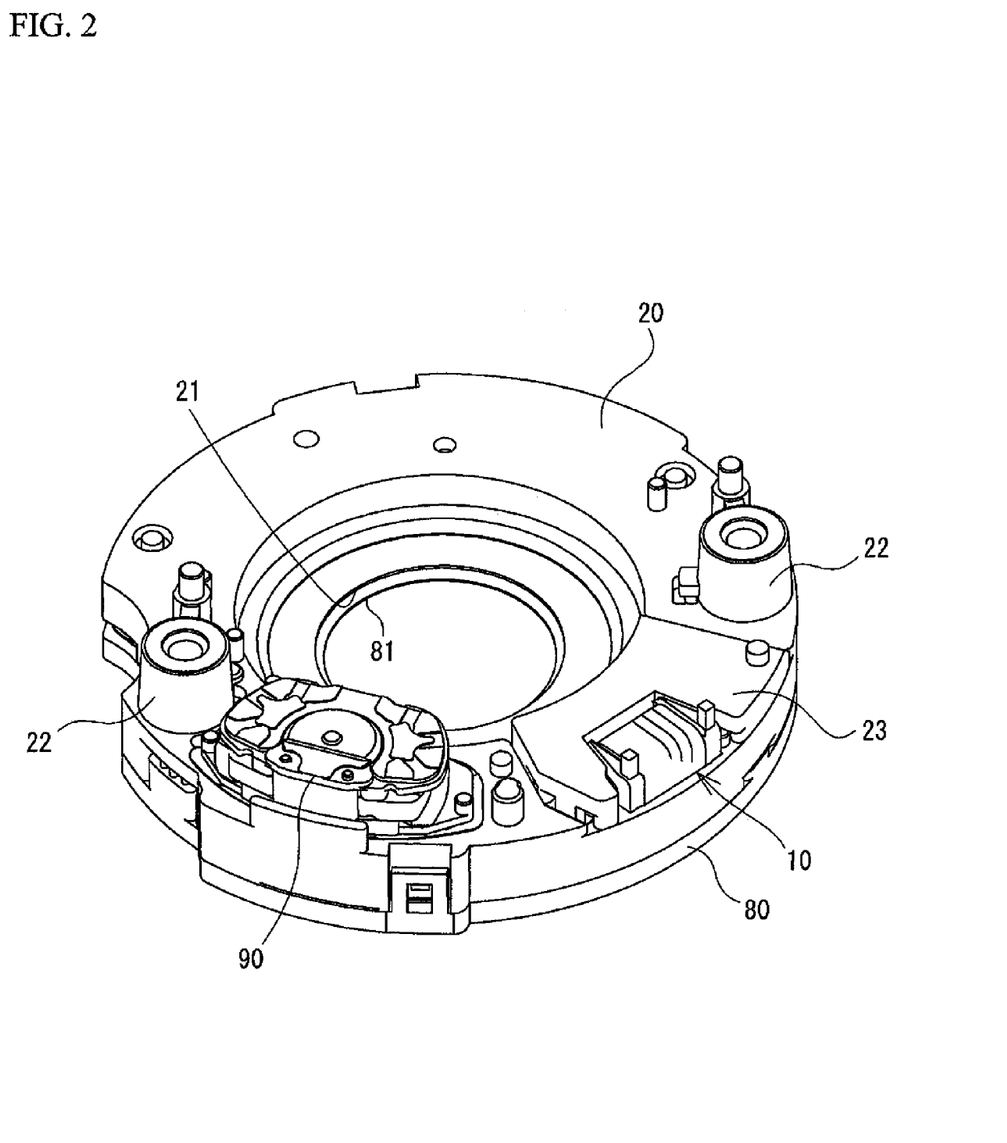
FIG. 2 is a perspective view of the blade drive device for a camera.
Figure 3:
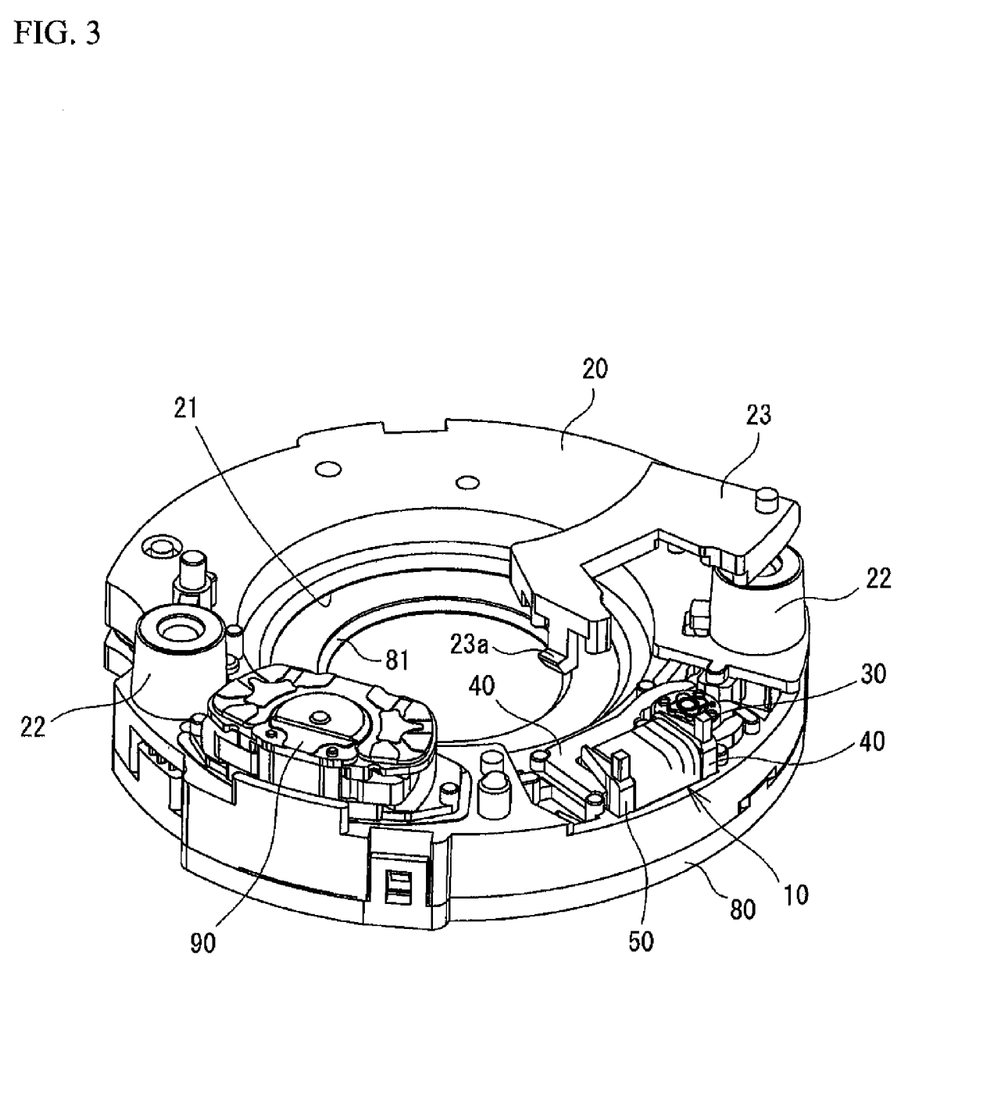
FIG. 3 is a perspective view of the blade drive device for a camera in which a cover is detached from a base plate.

FIG. 1 is an exploded perspective view of a blade drive device for a camera according to the present embodiment. FIG. 2 is a perspective view of the blade drive device for a camera. FIG. 3 is a perspective view of the blade drive device for a camera in which a cover is detached from a base plate.

The blade drive device for a camera includes: an electromagnetic actuator 10; a base plate 20; shutter blades 61 to 64; a plate 70; a blade supporting plate 80, and an aperture-blade electromagnetic actuator 90 for driving an aperture blade.

The electromagnetic actuator 10 serves as a driving source for driving the shutter blades 61 to 64. A rotor 30, to be mentioned later, of the electromagnetic actuator 10 rotates within a predetermined range, thereby swinging the shutter blades 61 to 64 within a predetermined range.

The base plate 20 has an opening 21 at a center thereof. The opening 21 is formed so that the object light is imaged on an image pickup device not shown.

Additionally, the base plate 20 has two attaching boss 22 extending in the optical axis direction, and the boss 22 is for attaching the blade drive device for a camera to a main camera.

The electromagnetic actuator 10, as shown in FIGS. 1 to 3, is installed in a housing portion 24 having a recess shape and formed in a part of the base plate 20, and the housing portion 24 is closed by a cover 23. Additionally, the cover 23 has a pawl 23a and is assembled into the base plate 20 by snap fitting.

The shutter blades 61 to 64 are disposed between the base plate 20 and the plate 70 with being partially overlapped one another.

The plate 70 is for improving a slidability of the shutter blades 61 to 64. The plate 70 is disposed between the shutter blades 61 to 64 and the blade supporting plate 80. The plate 70 has an opening 71 at a center thereof. Likewise, the blade supporting plate 80 has an opening 81 at a center thereof.

The aperture-blade electromagnetic actuator 90 serves as a driving source for an aperture blade not shown. The provision of the aperture blade permits aperture values of the openings 21, 71, and 81 to maintain constantly.

Next, the electromagnetic actuator will be described in detail.

Figure 4:
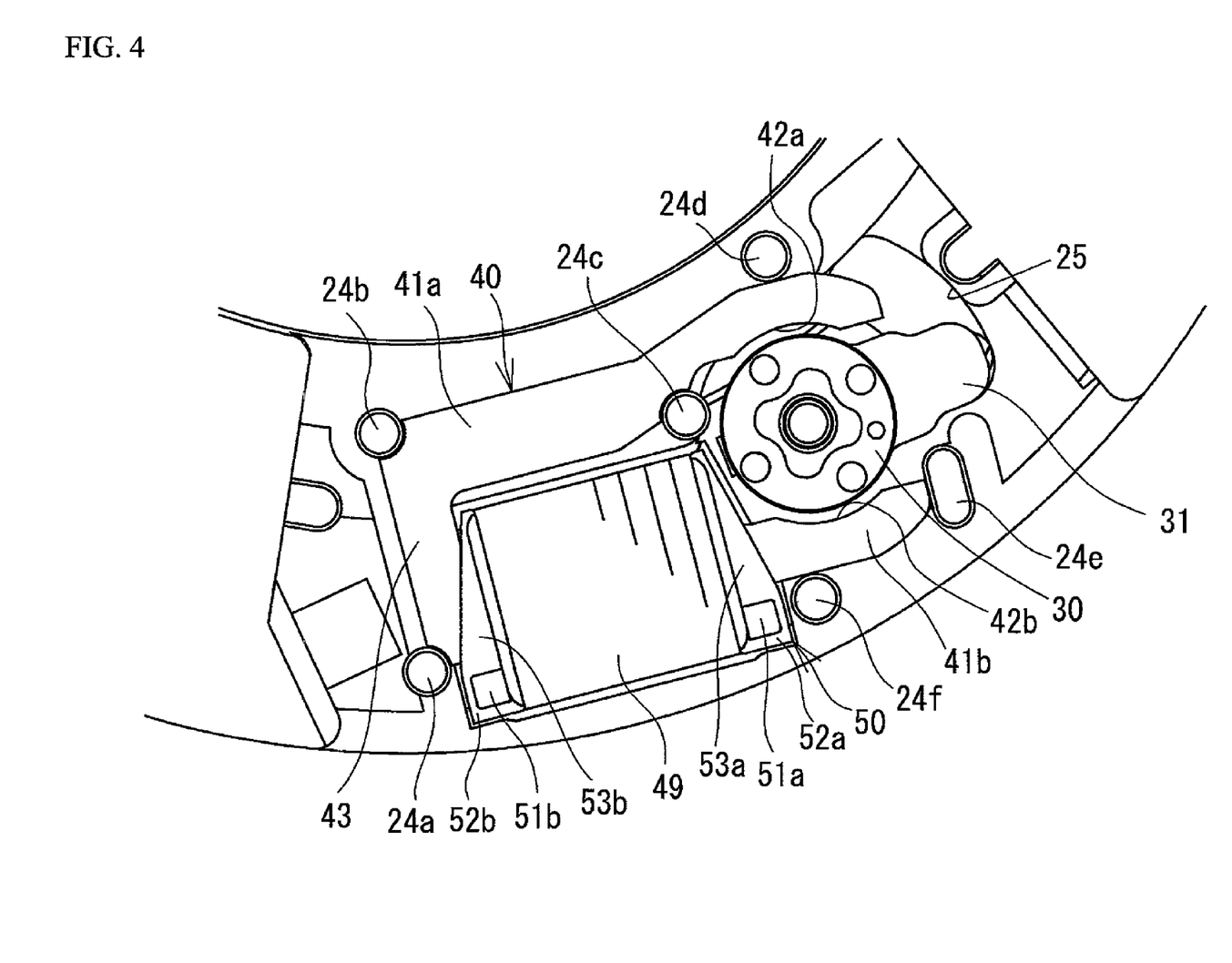
FIG. 4 is an enlarged front view of the electromagnetic actuator in which the cover is detached from the base plate.

FIG. 4 is an enlarged front view of the electromagnetic actuator in which the cover is detached from the base plate. The electromagnetic actuator 10 includes the rotor 30, a stator 40, and a coil bobbin 50.

The rotor 30 is magnetized with differential magnetic poles in a circumferential direction. The rotor 30 is rotatably supported with being penetrated through with a shaft formed within the housing portion 24. Further, an output pin 31, which outputs the rotation of the rotor 30 to the shutter blades 61 to 64, is assembled into the rotor 30. The output pin 31 swings in conjunction with the rotor 30. The output pin 31 engages with an arc slot 25 formed in the housing portion 24 and is possible to swing in a predetermined range.

The stator 40 includes a stator body portion 43, and a pair of leg portions 41a and 41b extending in a curve from both ends of the stator body portion 43, respectively, in a direction nearly perpendicular to the stator body portion 43. The stator 40 is shaped into a U shape. Magnetic pole portions 42a and 42b are formed at ends of the leg portions 41a and 41b, respectively. Magnetic pole portions 42a and 42b face an outer surface of the rotor 30.

The leg portion 41b of the stator 40 is inserted into the coil bobbin 50 around which a coil 49 is wound. The stator 40 is excited by energization of the coil 49, so that differential magnetic poles are generated in the magnetic pole portions 42a and 42b, respectively. By the magnetic poles generated in the magnetic pole portions 42a and 42, a magnetic force is generated to rotate the rotor 30.

Additionally, the stator 40 is positioned by guide pins 24a to 24f formed within the housing portion 24.

Next, the coil bobbin 50 will be elaborated with reference to FIGS. 4 and 5A to 5D.

Figure 5A:
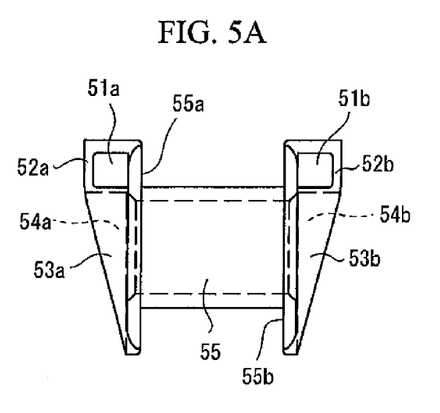
FIG. 5A is a front view of the coil bobbin.
Figure 5B:
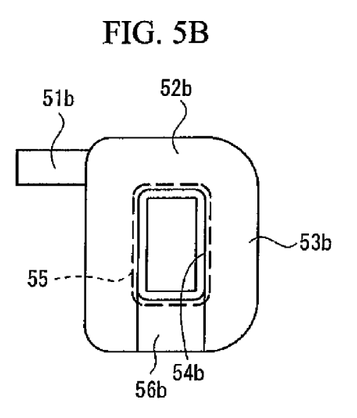
FIG. 5B is a right side view of the coil bobbin.
Figure 5C:
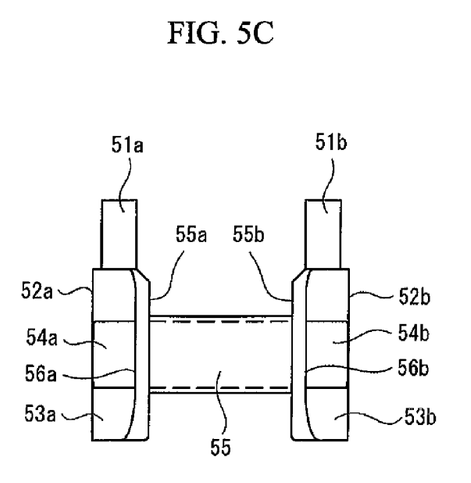
FIG. 5C is a bottom view of the coil bobbin.
Figure 5D:
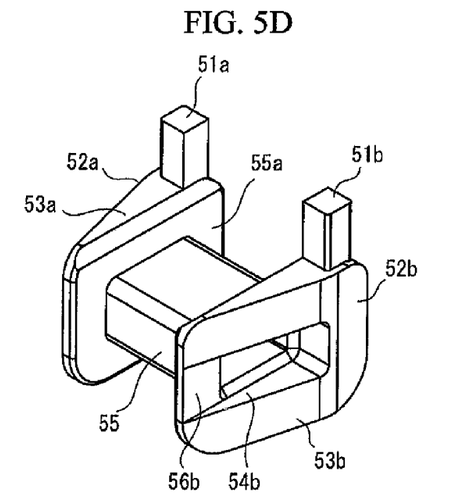
FIG. 5D is a perspective view of the coil bobbin.

FIGS. 5A to 5D are explanatory views of the coil bobbin 50. FIG. 5A is a front view of the coil bobbin 50. FIG. 5B is a right side view of the coil bobbin 50. FIG. 5C is a bottom view of the coil bobbin 50. FIG. 5D is a perspective view of the coil bobbin 50. Additionally, in FIGS. 5A to 5D, the coil 49 is not wound around the coil bobbin 50.

The coil bobbin 50 includes: a body portion 55 around which the coil 49 is wound and which has a cylindrical shape; a pair of flange portions formed at both ends of the body portion 55 respectively, and terminal portions 51a and 51b around which respective ends of the coil 49 are wound and which are formed in the pair of flange portions. The coil bobbin 50 is integrally made from a resin.

The leg portion 41b of the stator 40 is inserted into a hollowing portion of the body portion 55 as shown in FIG. 4.

In addition, the flange portions include respectively thicker portions 52a and 52b, and thinner portions 53a and 53b different from each other in the thickness. The thicker portions 52a and 52b have the terminal portions 51a and 51b, respectively. Further, the pair of the flange portions includes respectively inside surfaces 55a and 55b facing each other and extending in a direction orthogonal to an extending direction of the body portion 55.

The terminal portions 51a and 51b extend from end faces of the thicker portions 52a and 52b, respectively.

Additionally, the coil bobbin 50 is bilaterally-symmetric.

The thicker portions 52a and 52b strengthen the pair of flange portions. This prevents a deformation of the pair of the flange portions and improves endurance thereof. Specifically, a deformation of the flange portions is prevented at the case where the coil 49 is wound around the body portion 55. Additionally, the thinner portions 53a and 53b contribute to the downsizing of the coil bobbin 50.

In addition, the terminal portions 51a and 51b are formed in the thicker portions 52a and 52b, respectively, and supported therewith, respectively. This prevents a deformation of the terminal portions 51a and 51b in accordance with the deformation of the flange portion. Consequently, it is possible to eliminate a defect caused by the deformation of the terminal portions 51a and 51b.

Further, the flange portion is formed to gradually reduce the thickness from the thicker portion 52a toward the thinner portion 53a. Since the thickness of the flange portion is gradually changed, it is possible to prevent the lowering of the intensity according to drastic change in its thickness. Additionally, the gradual change in its thickness facilitates forming. This applies to the thicker portion 52b and the thinner portion 53b.

Specifically, each of the thicker portions 52a and 52b has a constant width, and each of the thinner portions 53a and 53b has a taper shape such that the thinner portions 53a and 53b are thinner as being away from the thicker portions 52a and the 52b, respectively.

Further, the thinner portions 53a and 53b have the insert openings 54a and 54b, respectively. The openings 54a and 54b are continuous with the hollowing portion of the body portion 55, and the insert openings 54a and 54b are inserted with the leg portion 41b of the stator 40.

With such a configuration, as compared to a case where there are provided insert openings for the stator 40 formed in the thicker portions 52a and 52b, a region of the stator 40 to be covered by the coil bobbin 50 is made smaller. That is to say, the region of the stator 40 to be inserted into the coil bobbin 50 is smaller, so that a smaller-sized stator, in which the leg portion 41b is shorter, can be employed. Accordingly, the electromagnetic actuator 10 is made smaller in size.

In addition, the flange portions have cutout surfaces 56a and 56b, respectively, having a thickness thinner than that of the thinner portions 53a and 53b. The cutout surfaces 56a and 56b are parallel with inside surfaces 55a and 55b, respectively. Each of the cutout surfaces 56a and 56b has a constant thickness of the flange portions. Additionally, the cutout surfaces 56a and 56b extend from the inner edges of the opening of the body portion 55 in such a direction that the thinner portions 53a and 53b are gradually thinner.

Between the cutout surfaces 56a and 56b, the cutout surface 56b comes into contact with the inside surface of the stator body portion 43 of the stator 40, as shown in FIG. 4. The cutout surface 56b has a thickness thinner than that of each the thinner portions 53a and 53b, and has an effect of receiving of the stator body portion 43 of the stator 40. That is to say, the cutout surfaces 56a and 56b enable the stator body portion 43 of the stator 40 to be positioned near the coil 49. Therefore, the smaller-sized stator whose leg portion is shorter can be employed. Consequently, the electromagnetic actuator 10 can be made smaller in size.

Figure 6:
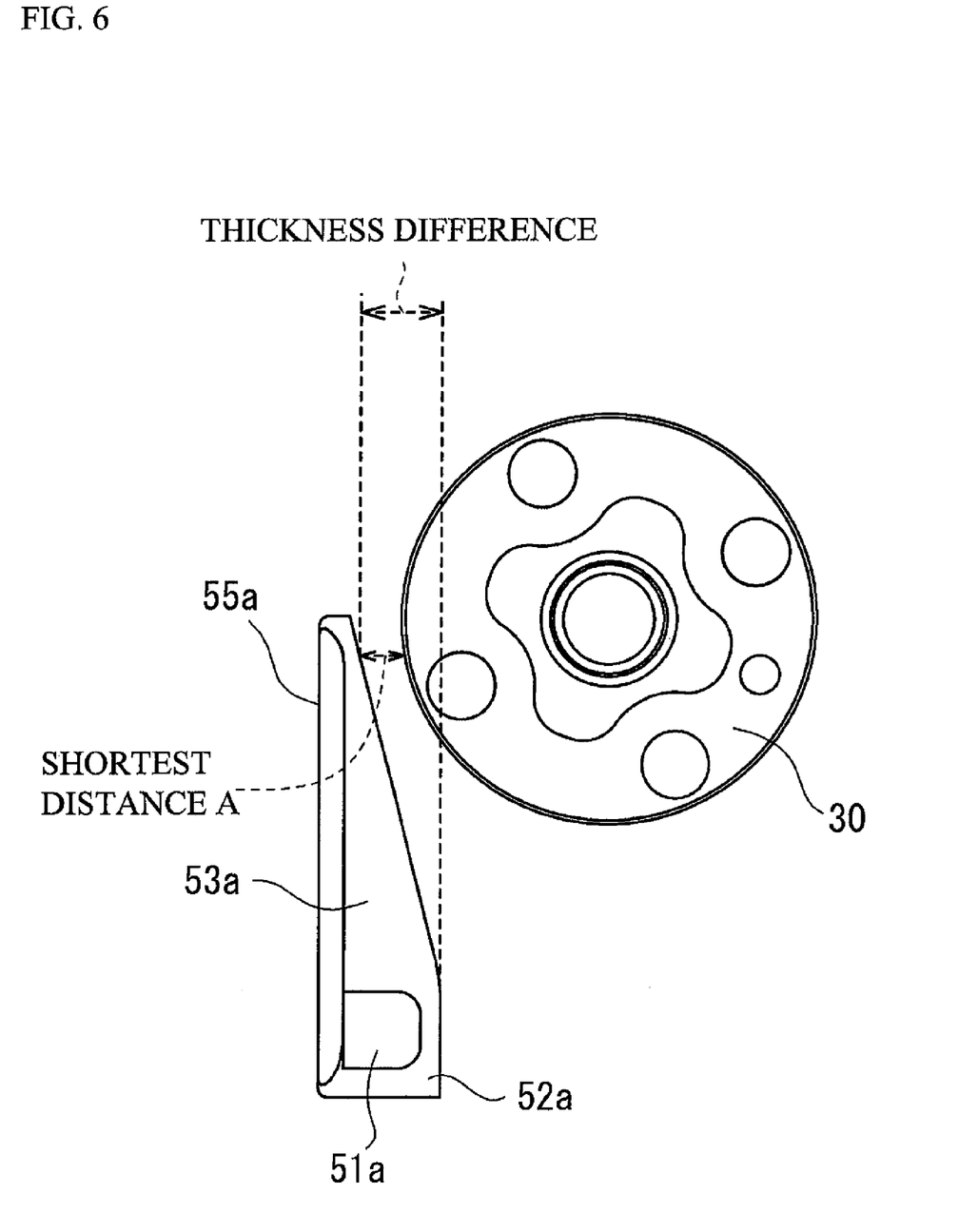
FIG. 6 is an explanatory view of positional relationships between the coil bobbin and a rotor.

Next, the positional relationships between the coil bobbin 50 and the rotor 30 will be described. FIG. 6 is an explanatory view of positional relationships between the coil bobbin 50 and the rotor 30. Additionally, in FIG. 6, constructional elements are omitted except the rotor 30 and the flange portion being disposed close to the rotor 30.

The shortest distance A shown in FIG. 6 is the shortest distance among distances from the thinner portion 53a to a peripheral surface of the rotor 30 in a direction perpendicular to the inside surface 55a. In addition, a thickness difference in FIG. 6 indicates a difference between the thickness of the thicker portion 52a and that of the thinner portion 53a. The thickness difference also indicates a difference between the thickness of the thinner portion 53a at an original position of the shortest distance A and the maximum thickness of the thicker portion 52a (in the present embodiment, the thickness of the thicker portion 52a is constant).

As shown in FIG. 6, the positional relationships between the rotor 30 and the flange portion is set such that the shortest distance A is shorter than the thickness difference. Consequently, the rotor 30 is disposed closer to the side surface of the thinner portion 53a.

With such a configuration, the rotor 30 can be disposed closer to the thinner portion 53a, by the thickness reduced by the thinner portion 53a. Therefore, a distance between the coil bobbin 50 and the rotor 30 can be shortened, and the electromagnetic actuator 10 can be downsized.

While the exemplary embodiments of the present invention have been illustrated in detail, the present invention is not limited to the above-mentioned embodiments, and other embodiments, variations and modifications may be made without departing from the scope of the present invention.

In the above embodiment, the both flange portions of the coil bobbin has the thicker portions and the thinner portions, respectively. However, any one of the both flange portions may have the thicker portion, the thinner portion, or the cutout surface.

Each of the thinner portions 53a and 53b is shaped into a taper shape such that it is gradually thinner. However, the present invention is not limited to such configurations, for example, a stepwise shape having a constant thickness in a partway thereof may be employed.

Additionally, each of the thicker portions 52a and 52b has the constant thickness. However, the thickness may be increased as being away from each of the thinner portions 53a and 53b.

Furthermore, in cooperation with the thicker portion and the thinner portion, the flange portion may be shaped into a taper shape such that the whole of the thickness thereof is gradually changed.

In the above embodiment, the leg portion 41b of the stator 40 is inserted into the coil bobbin 50. However, the stator body portion may be inserted into the coil bobbin 50.

Finally, several aspects of the present invention are summarized as follows.

According to a first aspect of the present invention, there is provided a coil bobbin including: a body portion around which a coil is wound and having a cylindrical shape; a pair of flange portions formed at both ends of the body portion respectively; and terminal portions formed in the pair of flange portions, respectively, the terminal portions being around which respective ends of the coil are wound, wherein at least one of the pair of flange portions has a thicker portion and a thinner portion different from each other in thickness, the at least one of the pair of flange portions is formed to gradually reduce a thickness from the thicker portion toward the thinner portion, and at least one of the terminal portions is formed in the thicker portion.

With such a configuration, since the at least one of the pair of flange portions has the thicker portion and the thinner portion different from each other in thickness, it is prevented that the flange portion is deformed to be warped outwardly by the coil wound around the body portion. This prevents a deformation of the flange portion and improves endurance thereof. Further, since the thickness of the flange portion is gradually changed, it is possible to prevent the lowering of the intensity according to drastic change in its thickness. Additionally, the gradual change in its thickness facilitates forming. In addition, since the terminal portion is formed in the thicker portion, a deformation of the terminal portion is prevented in accordance with the deformation of the flange portion. Additionally, the thinner portion contributes to the downsizing of the coil bobbin.

In the above configuration, the thinner portion may have an insert opening continuous with a hollow portion of the body portion, and the opening is inserted with a stator magnetized by energization of the coil.

With such a configuration, as compared to a case where there is provided an insert opening for the stator formed in the thicker portion, a region of the stator to be covered by the coil bobbin is made smaller. That is to say, the region of the stator to be inserted into the coil bobbin is smaller, so that a smaller-sized stator can be employed.

In the above configuration, the at least one of the pair of flange portions may have a cutout surface having a thickness thinner than that of the thinner portion for receiving a stator body portion extending in a curve from a leg portion, of the stator, which is fitted into the hollow portion of the body portion of the coil bobbin.

With such a configuration, a smaller-sized stator, in which the leg portion is shorter, can be employed.

Additionally, according to a second aspect of the present invention, there is provided an actuator including: a coil bobbin around which a coil for excitation is wound; a rotor magnetized with differential magnetic poles in a circumferential direction and rotatably supported; and a stator inserted into the coil bobbin and effecting driving force by magnetic force on the rotor by energization of the coil. The coil bobbin includes: a body portion around which a coil is wound and having a cylindrical shape; a pair of flange portions formed at both ends of the body portion respectively; and terminal portions formed in the pair of flange portions, respectively, the terminal portions being around which respective ends of the coil are wound. At least one of the pair of flange portions has a thicker portion and a thinner portion different from each other in thickness, the at least one of the pair of flange portions is formed to gradually reduce a thickness from the thicker portion toward the thinner portion, and at least one of the terminal portions is formed in the thicker portion.

With such a configuration, since the at least one of the pair of flange portions has the thicker portion and the thinner portion different from each other in thickness, it is prevented that the flange portion is deformed to be warped outwardly by the coil wound around the body portion. This prevents a deformation of the flange portion and improves endurance thereof. Further, since the thickness of the flange portion is gradually changed, it is possible to prevent the lowering of the intensity according to drastic change in its thickness. Additionally, the gradual change in its thickness facilitates forming. In addition, since the terminal portion is formed in the thicker portion, a deformation of the terminal portion is prevented in accordance with the deformation of the flange portion. Additionally, the thinner portion contributes to downsizing of the coil bobbin, thereby downsizing the actuator.

In the above configuration, the thinner portion may have an insert opening continuous with a hollow portion of the body portion and inserted with the stator.

With such a configuration, as compared to a case where there is provided an insert opening for the stator formed in the thicker portion, a region of the stator to be covered by the coil bobbin is made smaller. That is to say, the region of the stator to be inserted into the coil bobbin is smaller, so that a smaller-sized stator can be employed. Therefore, the actuator can be downsized.

In the above configuration, the rotor may be disposed closer to the thinner portion than a thickness difference between the thicker portion and the thinner portion, and a circumferential surface of the rotor partially may face the thinner portion.

With such a configuration, since the thinner portion and the rotor are adjacent and disposed to be faced with each other, the whole actuator is further downsized.

In the above configuration, the at least one of the pair of the flange portions may have a cutout surface having a thickness thinner than that of the thinner portion for receiving a body stator portion extending in carve from a leg portion, of the stator, which is fitted into the hollowing portion of the body portion of the coil bobbin.

With such a configuration, a smaller-sized stator, in which the leg portion is shorter, can be employed. Therefore, the actuator can be downsized.

Further, according to a third aspect of the present invention, there is provided a blade drive device for a camera, the device including: a base plate having a shutter opening; a blade supported for opening and closing the shutter opening; and the actuator of any one of the above described actuators, the actuator serving as a driving source of the blade.

With such a configuration, it is possible to provide a blade drive device for a camera, the device maintaining the smaller size thereof and improving the endurance thereof.

What is claimed is:

1. A coil bobbin comprising:
   a body portion around which a coil is wound and having a cylindrical shape;
   a pair of flange portions formed at both ends of the body portion respectively; and
   terminal portions formed in the pair of flange portions, respectively, the terminal portions being around which respective ends of the coil are wound,
   wherein at least one of the pair of flange portions has a thicker portion and a thinner portion different from each other in thickness, the at least one of the pair of flange portions is formed to gradually reduce a thickness from the thicker portion toward the thinner portion, and
   at least one of the terminal portions is formed in the thicker portion.

2. The coil bobbin of claim 1, wherein the thinner portion has an insert opening continuous with a hollow portion of the body portion, and the insert opening is inserted with a stator magnetized by energization of the coil.

3. The coil bobbin of claim 2, wherein the at least one of the pair of flange portions has a cutout surface having a thickness thinner than that of the thinner portion for receiving a stator body portion extending in a curve from a leg portion, of the stator, which is fitted into the hollow portion of the body portion of the coil bobbin.

4. The coil bobbin of claim 1, wherein the at least one of the pair of flange portions has a cutout surface having a thickness thinner than that of the thinner portion for receiving a stator body portion extending in a curve from a leg portion, of the stator, which is fitted into the hollow portion of the body portion of the coil bobbin.

5. An actuator comprising:
   a coil bobbin around which a coil for excitation is wound;
   a rotor magnetized with differential magnetic poles in a circumferential direction and rotatably supported; and
   a stator inserted into the coil bobbin and effecting driving force by magnetic force on the rotor by energization of the coil,
   wherein the coil bobbin includes:
   a body portion around which a coil is wound and having a cylindrical shape;
   a pair of flange portions formed at both ends of the body portion respectively; and
   terminal portions formed in the pair of flange portions, respectively, the terminal portions being around which respective ends of the coil are wound,
   wherein at least one of the pair of flange portions has a thicker portion and a thinner portion different from each other in thickness, the at least one of the pair of flange portions is formed to gradually reduce a thickness from the thicker portion toward the thinner portion, and
   at least one of the terminal portions is formed in the thicker portion.

6. The actuator of claim 5, wherein the thinner portion has an insert opening continuous with a hollow portion of the body portion and inserted with the stator.

7. The actuator of claim 6, wherein the rotor is disposed closer to the thinner portion than a thickness difference between the thicker portion and the thinner portion, and a circumferential surface of the rotor partially faces the thinner portion.

8. The actuator of claim 7, wherein the at least one of the pair of the flange portions has a cutout surface having a thickness thinner than that of the thinner portion for receiving a stator body portion extending in carve from a leg portion, of the stator, which is fitted into the hollowing portion of the body portion of the coil bobbin.

9. The actuator of claim 6, wherein the at least one of the pair of the flange portions has a cutout surface having a thickness thinner than that of the thinner portion for receiving a stator body portion extending in carve from a leg portion, of the stator, which is fitted into the hollowing portion of the body portion of the coil bobbin.

10. The actuator of claim 5, wherein the rotor is disposed closer to the thinner portion than a thickness difference between the thicker portion and the thinner portion, and a circumferential surface of the rotor partially faces the thinner portion.

11. The actuator of claim 10, wherein the at least one of the pair of the flange portions has a cutout surface having a thickness thinner than that of the thinner portion for receiving a stator body portion extending in carve from a leg portion, of the stator, which is fitted into the hollowing portion of the body portion of the coil bobbin.

12. The actuator of claim 5, wherein the at least one of the pair of the flange portions has a cutout surface having a thickness thinner than that of the thinner portion for receiving a stator body portion extending in carve from a leg portion, of the stator, which is fitted into the hollowing portion of the body portion of the coil bobbin.

13. A blade drive device for a camera, comprising:
a base plate having a shutter opening;
a blade supported for opening and closing the shutter opening; and
an actuator serving as a driving source of the blade, and the actuator comprising:
a coil bobbin around which a coil for excitation is wound;
a rotor magnetized with differential magnetic poles in a circumferential direction and rotatably supported; and
a stator inserted into the coil bobbin and effecting driving force by magnetic force on the rotor by energization of the coil,
wherein the coil bobbin includes:
a body portion around which a coil is wound and having a cylindrical shape;
a pair of flange portions formed at both ends of the body portion respectively; and
terminal portions formed in the pair of flange portions, respectively, the terminal portions being around which respective ends of the coil are wound,
wherein at least one of the pair of flange portions has a thicker portion and a thinner portion different from each other in thickness, the at least one of the pair of flange portions is formed to gradually reduce a thickness from the thicker portion toward the thinner portion, and
at least one of the terminal portions is formed in the thicker portion.

14. The blade drive device for a camera of claim 13, wherein the thinner portion has an insert opening continuous with a hollow portion of the body portion and inserted with the stator.

15. The blade drive device for a camera of claim 14, wherein the rotor is disposed closer to the thinner portion than a thickness difference between the thicker portion and the thinner portion, and a circumferential surface of the rotor partially faces the thinner portion.

16. The blade drive device for a camera of claim 14, wherein the at least one of the pair of the flange portions has a cutout surface having a thickness thinner than that of the thinner portion for receiving a stator body portion extending in carve from a leg portion, of the stator, which is fitted into the hollowing portion of the body portion of the coil bobbin.

17. The blade drive device for a camera of claim 14, wherein the at least one of the pair of the flange portions has a cutout surface having a thickness thinner than that of the thinner portion for receiving a stator body portion extending in carve from a leg portion, of the stator, which is fitted into the hollowing portion of the body portion of the coil bobbin.

18. The blade drive device for a camera of claim 13, wherein the rotor is disposed closer to the thinner portion than a thickness difference between the thicker portion and the thinner portion, and a circumferential surface of the rotor partially faces the thinner portion.

19. The blade drive device for a camera of claim 18, wherein the at least one of the pair of the flange portions has a cutout surface having a thickness thinner than that of the thinner portion for receiving a stator body portion extending in carve from a leg portion, of the stator, which is fitted into the hollowing portion of the body portion of the coil bobbin.

20. The blade drive device for a camera of claim 13, wherein the at least one of the pair of the flange portions has a cutout surface having a thickness thinner than that of the thinner portion for receiving a stator body portion extending in carve from a leg portion, of the stator, which is fitted into the hollowing portion of the body portion of the coil bobbin.

* * * * *